US011421381B2

(12) United States Patent
Min et al.

(10) Patent No.: US 11,421,381 B2
(45) Date of Patent: Aug. 23, 2022

(54) ARTIFICIAL LEATHER AND METHOD OF MANUFACTURING THE SAME

(71) Applicant: LG HAUSYS, LTD., Seoul (KR)

(72) Inventors: Chui Hee Min, Seoul (KR); Yongbae Jung, Seoul (KR); Inhyuk Lee, Seoul (KR)

(73) Assignee: LG Hausys, Ltd., Seoul (KR)

( * ) Notice: Subject to any disclaimer, the term of this patent is extended or adjusted under 35 U.S.C. 154(b) by 0 days.

(21) Appl. No.: 16/638,059

(22) PCT Filed: Sep. 11, 2018

(86) PCT No.: PCT/KR2018/010650
§ 371 (c)(1),
(2) Date: Feb. 10, 2020

(87) PCT Pub. No.: WO2019/054732
PCT Pub. Date: Mar. 21, 2019

(65) Prior Publication Data
US 2020/0190731 A1    Jun. 18, 2020

(30) Foreign Application Priority Data

Sep. 14, 2017 (KR) .................. 10-2017-0117553
Nov. 22, 2017 (KR) .................. 10-2017-0156752
(Continued)

(51) Int. Cl.
*D06N 3/06* (2006.01)
*B32B 27/08* (2006.01)
(Continued)

(52) U.S. Cl.
CPC .................. *D06N 3/06* (2013.01); *B32B 5/18* (2013.01); *B32B 27/08* (2013.01); *B32B 27/304* (2013.01);
(Continued)

(58) Field of Classification Search
CPC ...... D06N 3/06; D06N 3/0006; D06N 3/0011; D06N 3/0043; D06N 2201/042;
(Continued)

(56) References Cited

U.S. PATENT DOCUMENTS

2015/0239224 A1* 8/2015 Dandl ................ B29C 63/0047
427/207.1

FOREIGN PATENT DOCUMENTS

CN    102850691 A    1/2013
CN    106702753 A    5/2017
(Continued)

OTHER PUBLICATIONS

Machine Translation of KR 10-2009-0078185 A. (Year: 2009).*
(Continued)

*Primary Examiner* — Brian Handville
(74) *Attorney, Agent, or Firm* — Dentons US LLP

(57) ABSTRACT

The present invention relates to artificial leather and a method of manufacturing the same. More particularly, the present invention relates to artificial leather for automobile seat covers, the artificial leather having a texture similar to that of natural leather, having a soft feel like natural leather, and having excellent peel strength and a method of manufacturing the artificial leather.

8 Claims, 6 Drawing Sheets

(30) Foreign Application Priority Data

| Nov. 22, 2017 | (KR) | 10-2017-0156754 |
|---|---|---|
| Nov. 24, 2017 | (KR) | 10-2017-0158790 |
| Aug. 22, 2018 | (KR) | 10-2018-0098225 |
| Aug. 22, 2018 | (KR) | 10-2018-0098242 |
| Aug. 22, 2018 | (KR) | 10-2018-0098243 |

(51) Int. Cl.
| B32B 27/30 | (2006.01) |
|---|---|
| B32B 37/04 | (2006.01) |
| B32B 38/06 | (2006.01) |
| D06N 3/00 | (2006.01) |
| B60N 2/58 | (2006.01) |
| B32B 5/18 | (2006.01) |

(52) U.S. Cl.
CPC .............. *B32B 37/04* (2013.01); *B32B 38/06* (2013.01); *B60N 2/5891* (2013.01); *D06N 3/0006* (2013.01); *D06N 3/0011* (2013.01); *D06N 3/0043* (2013.01); *B32B 2255/02* (2013.01); *B32B 2255/26* (2013.01); *B32B 2262/0276* (2013.01); *B32B 2262/062* (2013.01); *B32B 2266/0235* (2013.01); *B32B 2266/08* (2013.01); *B32B 2305/022* (2013.01); *B32B 2327/06* (2013.01); *B32B 2601/00* (2013.01); *B32B 2605/003* (2013.01); *B32B 2605/08* (2013.01); *D06N 2201/02* (2013.01); *D06N 2201/042* (2013.01); *D06N 2209/1642* (2013.01)

(58) Field of Classification Search
CPC ....... D06N 2209/1642; D06N 2201/02; D06N 3/14; D06N 3/0077; D06N 3/0065; D06N 3/005; B32B 27/08; B32B 27/304; B32B 37/04; B32B 38/06; B32B 5/18; B32B 2255/02; B32B 2255/26; B32B 2262/062; B32B 2262/0276; B32B 2266/0235; B32B 2266/08; B32B 2305/022; B32B 2327/06; B32B 2601/00; B32B 2605/08; B32B 2605/003; B60N 2/5891
See application file for complete search history.

(56) References Cited

FOREIGN PATENT DOCUMENTS

| JP | 2012-127010 A | 7/2012 |
|---|---|---|
| KR | 10-0540191 A | 12/2005 |
| KR | 10-2009-0078185 A | 7/2009 |
| KR | 10-2013-0130224 A | 12/2013 |
| KR | 10-1450604 B1 | 12/2013 |
| KR | 10-2017-0018580 A | 2/2017 |
| WO | 2017/061611 A1 | 4/2017 |

OTHER PUBLICATIONS

Machine Translation of KR 10-2009-0078185 A, provided by K-PION (http://kposd.kipo.go.kr:8088/up/kpion/) (Year: 2009).*
Machine Translation of KR 10-0540191 B1 A, provided by K-PION (http://kposd.kipo.go.kr:8088/up/kpion/) (Year: 2006).*
International Search Report from PCT/KR2018/010650, dated Dec. 20, 2018.
Written Opinion of the ISA from PCT/KR2018/010650, dated Dec. 20, 2018.

* cited by examiner

[Fig. 1]
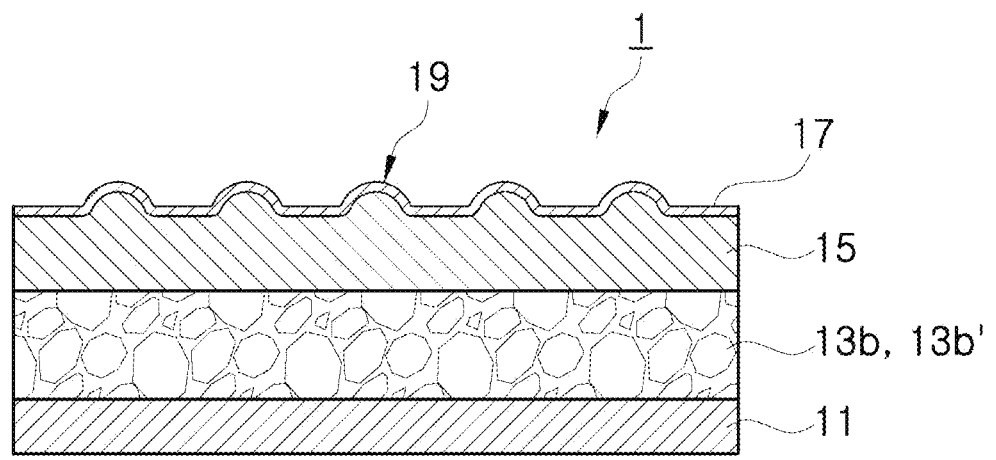

[Fig. 2]
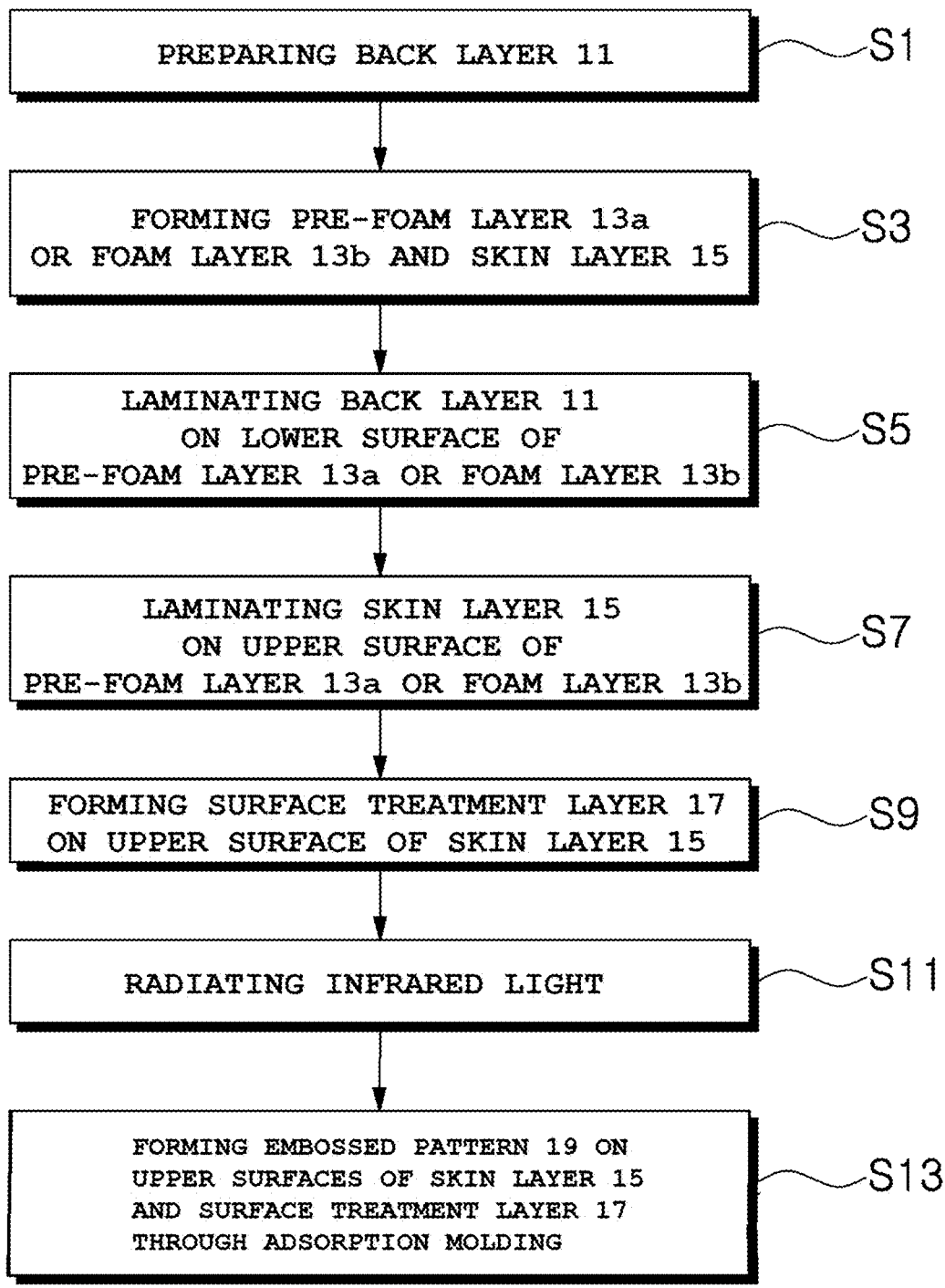

[Fig. 3]
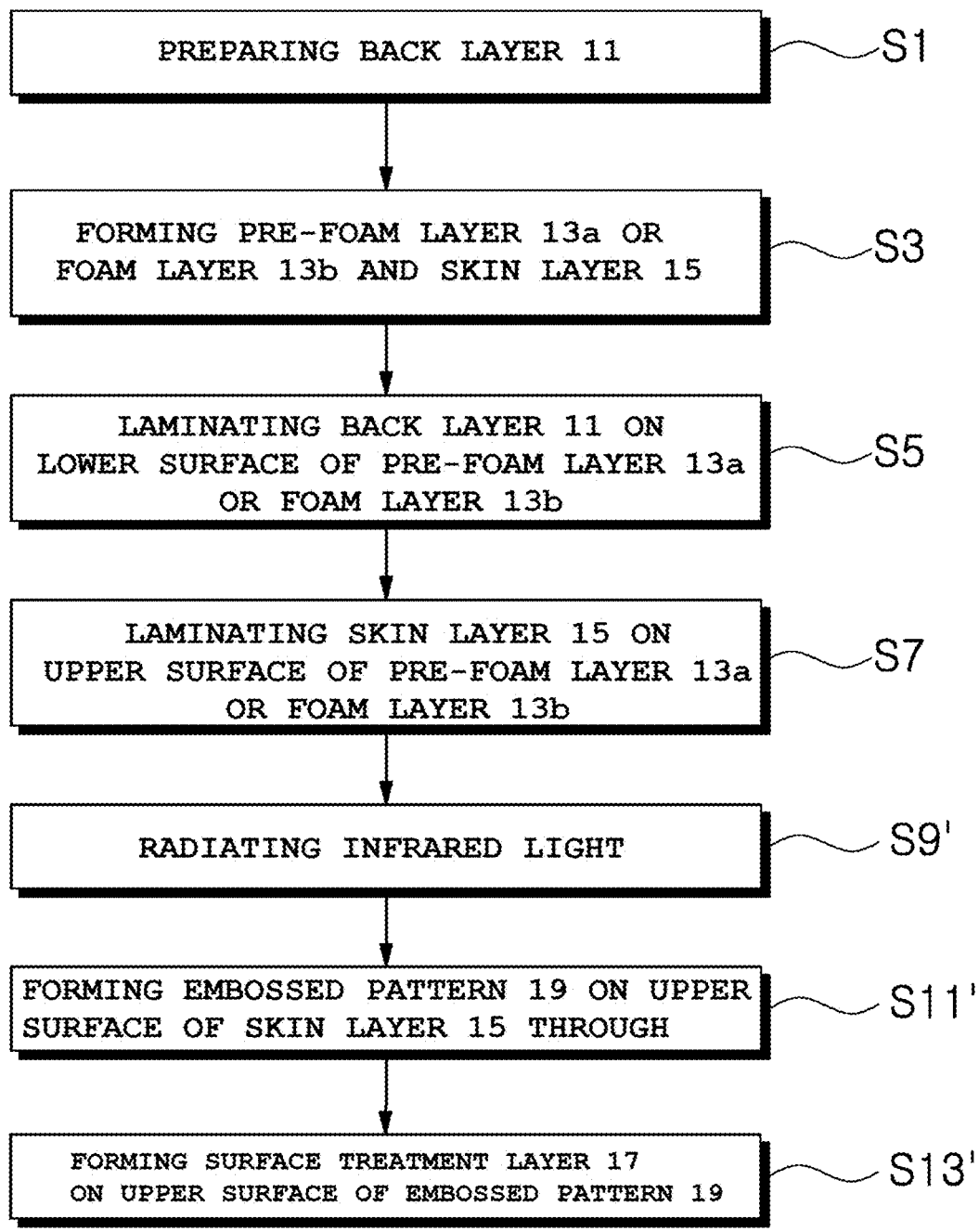

[Fig. 4]
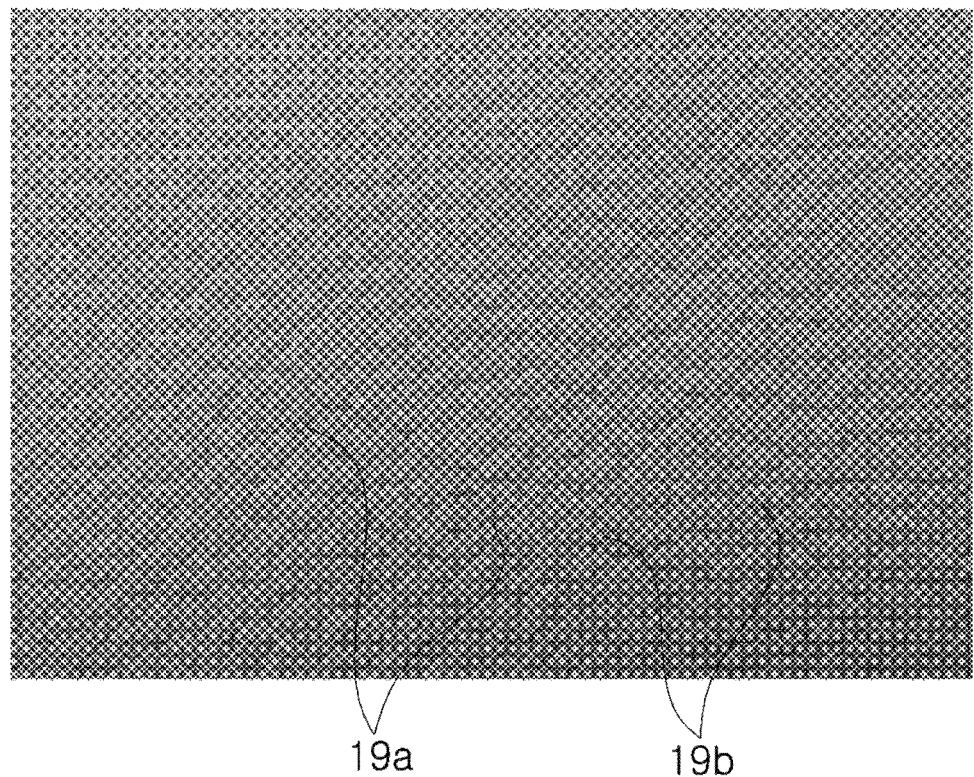

[Fig. 5]
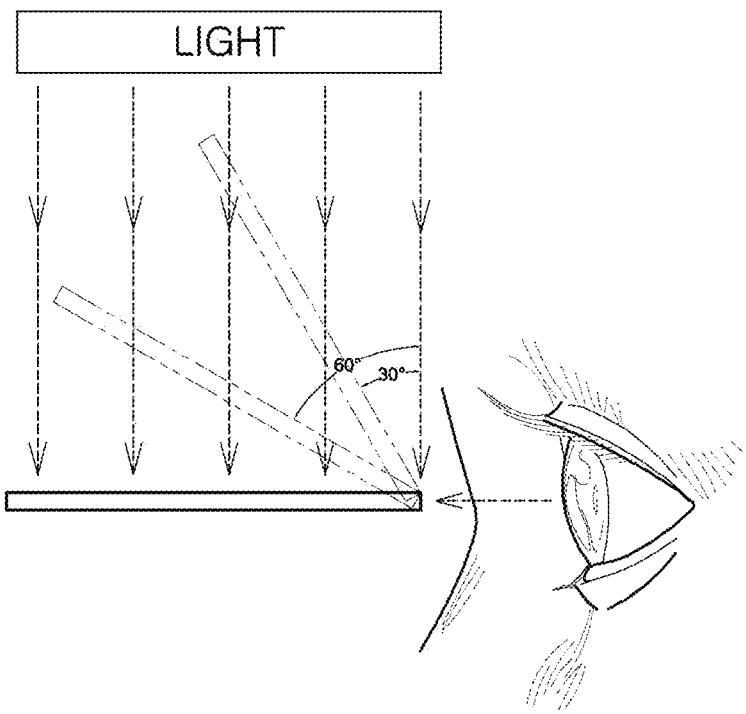
[Fig. 6]
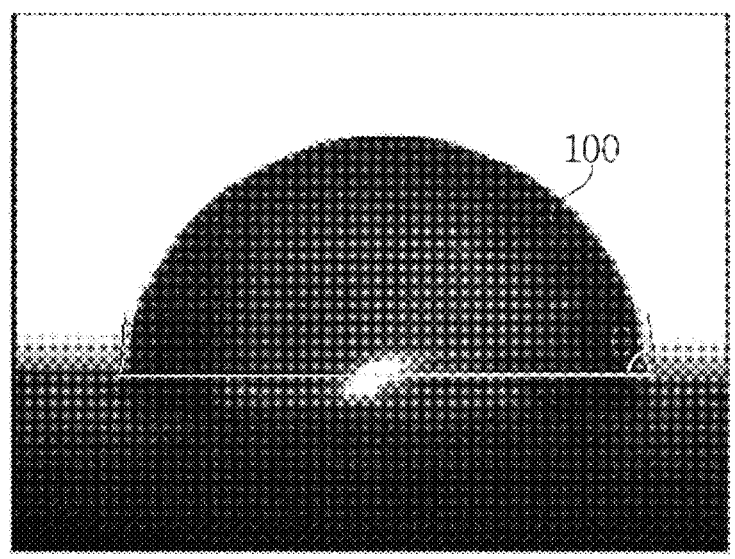

[Fig. 7]
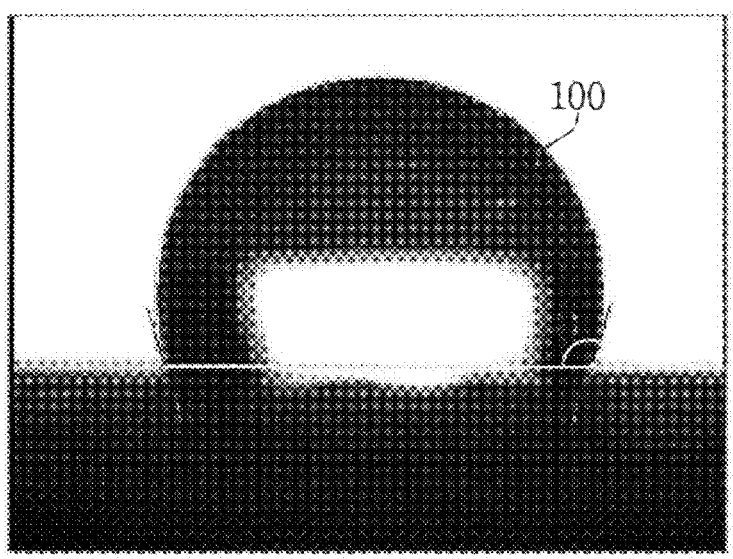

ARTIFICIAL LEATHER AND METHOD OF MANUFACTURING THE SAME

This application is a National Stage Entry of International Application No. PCT/KR2018/010650, filed on Sep. 11, 2018, and claims the benefit of and priority to Korean Application No. 10-2017-0117553, filed on Sep. 14, 2017, Korean Application No. 10-2017-0156754, filed on Nov. 22, 2017, Korean Application No. 10-2017-0156752, filed on Nov. 22, 2017, Korean Application No. 10-2017-0158790, filed on Nov. 24, 2017, Korean Application No. 10-2018-0098242, filed on Aug. 22, 2018, Korean Application No. 10-2018-0098225, filed on Aug. 22, 2018, and Korean Application No. 10-2018-0098243, filed on Aug. 22, 2018 all of which are hereby incorporated by reference in their entirety for all purposes as if fully set forth herein.

TECHNICAL FIELD

The present invention relates to artificial leather and a method of manufacturing the same. More particularly, the present invention relates to artificial leather for automobile seat covers, the artificial leather having a texture similar to that of natural leather, having a soft feel like natural leather, and having excellent peel strength and a method of manufacturing the artificial leather.

BACKGROUND ART

In general, the inside of an automobile is considered as a second home. In recent years, as demand for a pleasant and comfortable driving environment in automobiles has increased, functional seats are attracting considerable attention.

Natural leather or polyvinyl chloride and polyurethane artificial leathers are widely used as materials for automobile seats. Artificial leather is cheaper than natural leather. However, in terms of aesthetics and functionality that provides a pleasant driving environment, natural leather is remarkably superior to artificial leather.

Accordingly, efforts have been made to develop artificial leather that can satisfy the aesthetics and functionality of natural leather at a low cost. That is, in terms of functionality, natural leather has high moisture permeability. Due to this feature, natural leather can lower the surface temperature of seats in summer. More specifically, the moisture permeability of natural leather is high because moisture and heat are transmitted through pores formed in the surface and inside of the natural leather.

Specifically, as disclosed in KR 10-1450604 B1 (Publication date: Oct. 23, 2014), conventional artificial leather has a structure in which a back layer, a foam layer, a skin layer, and a surface treatment layer are laminated from the bottom to the top.

In this case, each of the foam layer and the skin layer are mainly formed of a polyvinyl chloride material or a polyurethane material and is laminated to have a predetermined thickness through a calendering or casting process. Then, through a foam process, the foam layer is foam-molded at a certain magnification.

In addition, to impart the texture and cushioning of natural leather, embossing molding using roller pressing is performed. Specifically, a semi-finished product in which the back layer, the foam layer, and the skin layer are laminated is passed between embossing rollers so that an embossed pattern is transferred on the upper surface of the semi-finished product.

However, in the case of embossing molding using roller pressing, by applying high pressure to the semi-finished product, a predetermined peel strength may be imparted to artificial leather. However, the number of foam cells in the foam layer is deceased due to destruction of foam cells, and the foam cells have irregular shapes such as distorted, elongated, and burst shapes. As a result, cushioning of the foam layer before embossing molding is hardly maintained after embossing molding.

RELATED ART DOCUMENTS

Patent Documents (Patent Document 1) KR 10-1450604 B1 (Publication date: Oct. 23, 2014)

DISCLOSURE

Technical Problem

Therefore, the present invention has been made in view of the above problems, and it is one object of the present invention to provide artificial leather having a texture similar to that of natural leather and having a soft feel like natural leather.

It is another object of the present invention to provide artificial leather having excellent peel strength.

It is yet another object of the present invention to provide artificial leather having excellent cushioning by preventing foam cells constituting foam layers from being distorted or damaged.

Technical Solution

In accordance with one aspect of the present invention, provided is artificial leather having a microhardness of 45 to 59, wherein the microhardness is a maximum value measured immediately after a needle is in contact with the artificial leather at an indentation speed of 1 mm/s in a peak hold mode using a microhardness tester (Micro durometer, Model name: MD-1 capa, Brand: ASKER), i.e., when load holding time of the needle is 1 second.

In accordance with another aspect of the present invention, provided is artificial leather including a back layer, one surface of which is coated with a coating solution.

In accordance with yet another aspect of the present invention, provided is a method of manufacturing artificial leather, the method including: step S1 of preparing a back layer formed of woven fabric or nonwoven fabric;

step S3 of separately forming a pre-foam layer or foam layer and a skin layer by molding;

step S5 of laminating the back layer on lower surface of the pre-foam layer or foam layer;

step S7 of laminating the skin layer on an upper surface of the pre-foam layer or foam layer on which the back layer is formed;

step S9 of coating an upper surface of the skin layer with a water-based surface treatment agent to form a surface treatment layer;

step S11 of irradiating an upper surface of the surface treatment layer with infrared light; and step S13 of forming an embossed pattern through vacuum adsorption molding on upper surfaces of the skin layer and surface treatment layer heated by irradiation with infrared light, wherein the artificial leather has a microhardness of 45 to 59, wherein the microhardness is a maximum value measured immediately after a needle is in contact with the artificial leather at an indentation speed of 1 mm/s in a peak hold mode using a microhardness tester (Micro durometer, Model name: MD-1 capa, Brand: ASKER), i.e., when load holding time of the needle is 1 second.

Advantageous Effects

Artificial leather of the present invention has a texture similar to that of natural leather and has a soft feel like natural leather.

In addition, the artificial leather of the present invention has excellent peel strength.

In addition, the artificial leather of the present invention can implement excellent cushioning by preventing foam cells constituting foam layers from being distorted or damaged.

DESCRIPTION OF DRAWINGS

FIG. 1 is a side cross-sectional view of artificial leather of the present invention, showing a laminated structure thereof.

FIG. 2 is a flowchart showing one embodiment of a method of manufacturing artificial leather according to the present invention.

FIG. 3 is a flowchart showing another embodiment of a method of manufacturing artificial leather according to the present invention.

FIG. 4 is an image showing the surface (embossed pattern) of artificial leather of the present invention.

FIG. 5 is a drawing for explaining a method of measuring the surface gloss difference of artificial leather.

FIG. 6 is an image showing the degree of condensation of liquid when measuring the surface tension of a surface treatment layer formed using an oil-based surface treatment agent.

FIG. 7 is an image showing the degree of condensation of liquid when measuring the surface tension of a surface treatment layer formed using a water-based surface treatment agent according to the present invention.

BEST MODE

Hereinafter, the functions or constructions of preferred embodiments of the present invention will now be described more fully with reference to the accompanying drawings.

Here, when reference numerals are applied to constituents illustrated in each drawing, it should be noted that like reference numerals indicate like elements throughout the specification.

The present invention relates to artificial leather having a microhardness of 45 to 59 or 50 to 57.

The microhardness refers to a local hardness for a microscopic specimen having a thickness of approximately 0.5 to 1.5 mm. The microhardness is a maximum value measured immediately after a needle is in contact with the artificial leather at an indentation speed of 1 mm/s in a peak hold mode using a microhardness tester (Micro durometer, Model name: MD-1 capa, Brand: ASKER), i.e., when the load holding time of the needle is 1 second.

Specifically, hardness may be measured using various methods, e.g., a Shore Hardness (SH) test, a Rock Hardness (RH) test, a Vickers Hardness (VH) test, a Knoop Hardness (KH) test, and a microhardness test. Thereamong, the Shore Hardness test is most commonly used when measuring the hardness of artificial leather.

However, the Shore Hardness test is a method of measuring the hardness of specimens having a thickness of 5 mm or more, and thus is not suitable for measuring microscopic specimens having a thickness of less than 5 mm.

The microhardness test is a method of measuring the hardness of specimens having a thickness of less than 5 mm, e.g., microscopic specimens having a thickness of 0.5 to 1.5 mm, and may be performed using a microhardness tester, e.g., Micro Durometer (Model name: MD-1 capa, Brand: ASKER).

In the present invention, when microhardness exceeds the above range, it is difficult to realize a soft feel. When microhardness is below the above range, mechanical properties such as wear resistance may be degraded. Accordingly, to realize a soft feel and excellent cushioning, the artificial leather of the present invention preferably has a microhardness within the above range.

In addition, the present invention relates to artificial leather including a back layer, one side of which is coated with a coating solution.

FIG. 1 is a side cross-sectional view of the artificial leather of the present invention, showing a laminated structure thereof. Artificial leather 1 of the present invention may include a back layer 11, foam layers 13b and 13b', a skin layer 15, and a surface treatment layer 17, which are laminated from the bottom to the top. In this case, an embossed pattern 19 may be formed on upper surfaces of the skin layer 15 and the surface treatment layer 17.

Hereinafter, each layer of the artificial leather according to the present invention will be described in more detail.

Back Layer 11

The back layer 11 of the present invention serves to maintain the shape of the artificial leather and to prevent generation of wrinkles in the artificial leather, thereby improving mechanical properties of the artificial leather. The back layer 11 may be formed of flexible polymers, such as woven fabric, nonwoven fabric, knitted fabric, plain weave, and spun-bonded fabric, made of various composites based on cotton, rayon, silk, polyolefins (e.g., polyethylene, polypropylene, etc.), nylon, polyesters, polyurethanes, and the like, and may optionally further include natural fiber and/or synthetic fiber.

Preferably, when the back layer 11 is formed, mechanical properties, such as strength, and flame retardant properties may be easily secured. The back layer 11 may be formed of woven fabric or nonwoven fabric including cotton or rayon and a polyester in a weight ratio of 30 to 40:60 to 70 so that sewing performance is improved and a clean appearance is realized in relation to the foam layers 13b and 13b'.

When the content of the polyester exceeds the above range, flammability, covering properties, and workability may be degraded. When the content of the polyester is below the above range, mechanical properties may be degraded. Accordingly, the polyester is preferably included in a content within the above range.

In addition, a coating layer may be formed on one surface of the back layer 11 to increase the peel strength between the back layer 11 and the foam layers 13b and 13b' formed on the upper surface of the back layer 11.

Specifically, according to the present invention, since an embossed pattern is formed through vacuum adsorption molding during step S13 (embossing molding step) to be described later, high pressure is not applied to a semi-finished product as in the case of forming an embossed pattern using a conventional roller pressing-type embossing roller, and thus the peel strength between the back layer 11 and the foam layers 13b and 13b' may be reduced. Accordingly, in the present invention, to increase the peel strength between the back layer 11 and the foam layers 13b and 13b', a coating solution may be applied to one surface of the back layer 11, and then gelling of the coating solution may be performed by heating at 120 to 150° C. to form a coating layer.

The coating solution may be an acrylic adhesive, a polyurethane adhesive, or a polyvinyl chloride plastisol. However, since the acrylic adhesive becomes hard after drying, there is a disadvantage in that the microhardness of artificial leather is increased. In addition, since the polyurethane adhesive is expensive, material costs may be increased. Thus, the polyvinyl chloride plastisol is preferably used.

The polyvinyl chloride plastisol may be obtained by stirring 70 to 130 parts by weight of a plasticizer and 0.5 to 10 parts by weight of a curing agent based on 100 parts by weight of a polyvinyl chloride resin at room temperature.

Specifically, the polyvinyl chloride resin may be a mixed resin consisting of 60 to 90% by weight of a homopolymer of vinyl chloride and 10 to 40% by weight of a copolymer of vinyl chloride and vinyl acetate.

The vinyl chloride homopolymer is a paste polyvinyl chloride resin prepared using emulsion polymerization, and may be included in an amount of 60 to 90% by weight or 65 to 85% by weight in the mixed resin. When the content of the vinyl chloride homopolymer is below the above range, the peel strength between the back layer 11 and the foam layers 13b and 13b' may be reduced. When the content of the vinyl chloride homopolymer exceeds the above range, odor may be severe. Thus, the vinyl chloride homopolymer is preferably included in an amount within the above range.

The copolymer of vinyl chloride and vinyl acetate is a resin capable of providing strong adhesive force to the back layer 11 made of woven fabric or nonwoven fabric. The content of vinyl acetate included in the copolymer may be 1 to 15% by weight or 3 to 10% by weight. When the content of vinyl acetate is below the above range, adhesive force may be reduced, thereby reducing the peel strength between the back layer 11 and the foam layers 13b and 13b'. When the content of vinyl acetate exceeds the above range, hydrolyzability may be degraded. Thus, vinyl acetate is preferably included in an amount within the above range.

In addition, the copolymer of vinyl chloride and vinyl acetate may be included in an amount of 10 to 40% by weight or 15 to 35% by weight in the mixed resin. When the content of the copolymer is below the above range, the peel strength between the back layer 11 and the foam layers 13b and 13b' may be reduced. When the content of the copolymer exceeds the above range, mechanical properties such as heat resistance may be degraded. Thus, the copolymer is preferably included in an amount within the above range.

The plasticizer contained in the coating solution may include one or more selected from phthalate-based plasticizers, terephthalate-based plasticizers, benzoate-based plasticizers, citrate-based plasticizers, phosphate-based plasticizers, and adipate-based plasticizers.

In the present invention, eco-friendly and heat resistant terephthalate-based plasticizers are preferably used. For example, dioctyl terephthalate may be used as the terephthalate-based plasticizer, without being limited thereto.

The plasticizer may be included in an amount of 70 to 130 parts by weight or 80 to 120 parts by weight based on 100 parts by weight of the mixed resin. When the content of the plasticizer is below the above range, the viscosity of the coating solution may be increased, resulting in poor processability. When the content of the plasticizer exceeds the above range, adhesive force may decrease due to plasticizer transfer. Thus, the plasticizer is preferably included in an amount within the above range.

As the curing agent included in the coating solution, a low temperature curable curing agent may be used to increase energy efficiency and productivity. For example, a block isocyanate curing agent in which some or all of isocyanate groups are blocked with a blocking agent may be used as the curing agent.

The blocking agent may include one or more selected from the group consisting of phenol, ε-caprolactam, methyl ethyl ketone oxime, 1,2-pyrazole, diethyl malonate, diisopropylamine, triazole, imidazole, and 3,5-dimethylpyrazole.

The block isocyanate curing agent blocks an isocyanate group (—NCO) to prevent the isocyanate group from reacting with a hydroxyl group (—OH) or an amino group (—NH) at room temperature, and when the temperature reaches a certain temperature range, a blocking agent is dissociated and the reactivity of the isocyanate group (—NCO) increases. As a result, curing reaction proceeds.

The dissociation temperature of the curing agent may be 100° C. or more or 110 to 130° C.

The curing agent may be included in an amount of 0.5 to 10 parts by weight or 1 to 5 parts by weight based on 100 parts by weight of the mixed resin. When the content of the curing agent is below the above range, due to decrease in a degree of crosslinking, the peel strength between the back layer 11 and the foam layers 13b and 13b' may be reduced. When the content of the curing agent exceeds the above range, the unreacted curing agent remains as impurities, thereby degrading usability. Thus, the curing agent is preferably included in an amount within the above range.

When necessary, the coating solution may further include one or more additives selected from the group consisting of stabilizers, fillers, pigments, viscosity lowering agents, and dispersants, and the content of the additives may be determined without limitation as long as the additives do not affect the physical properties of the coating solution.

When viscosity is measured at 25° C. using a Zahn cup (cup #3) viscometer, the viscosity of the coating solution may be 80 to 140 seconds or 100 to 120 seconds. When the viscosity of the coating solution is below the above range, the coating solution may flow down, thereby reducing coating efficiency. When the viscosity of the coating solution exceeds the above range, the coating solution aggregates upon coating, which prevents the coating solution from being impregnated into the back layer 11 made of woven fabric or nonwoven fabric. Thus, to ensure stable processability, the coating solution is preferably prepared to have a viscosity within the above range.

For example, the thickness of the coating layer formed on the back layer 11 may be 1 to 10 μm or 2 to 5 μm. Here, when the thickness of the coating layer is measured, the depth of the coating solution impregnated into the back layer 11 is also included. When the thickness of the coating layer is below the above range, the peel strength between the back layer 11 and the foam layers 13b and 13b' may be reduced. When the thickness of the coating layer exceeds the above range, the microhardness of artificial leather may be increased, leading to loss of softness. Thus, coating is preferably performed so that the coating layer has a thickness within the above range.

When the coating layer is formed on one surface of the back layer 11, the peel strength between the back layer 11 and the foam layers 13b and 13b' may be 2.5 to 6 kgf/30 mm or 2.5 to 5.5 kgf/30 mm. When the peel strength is below the above range, the foam layers 13b and 13b' may be easily peeled off from the back layer 11, which degrades the quality of artificial leather. When the peel strength exceeds the above range, microhardness may be increased, leading to loss of softness. Thus, the peel strength is preferably maintained within the above range.

In addition, the thickness of the back layer 11 may be 0.4 to 0.7 mm. When the thickness of the back layer 11 is below the above range, mechanical strength may be reduced. When the thickness of the back layer 11 exceeds the above range, the back layer 11 may be thicker than necessary, which increases material cost.

Foam Layers 13b and 13b'

According to the present invention, the foam layers 13b and 13b' serve to impart soft properties and cushioning to artificial leather, and may include 60 to 120 parts by weight of a plasticizer and 5 to 15 parts by weight of a foaming agent based on 100 parts by weight of a polyvinyl chloride resin.

Specifically, the polyvinyl chloride resin may be a straight polyvinyl chloride resin prepared by suspension polymerization that may secure excellent cushioning and durability and high elongation at the same time.

The polyvinyl chloride resin may have a degree of polymerization of 900 to 1,200 or 950 to 1,150. When the degree of polymerization is below the above range, durability may be degraded. When the degree of polymerization exceeds the above range, the hardness of the foam layers 13b and 13b' may be increased, leading to decrease in cushioning. Thus, the polyvinyl chloride resin having a degree of polymerization within the above range is preferably used.

In addition, according to the present invention, to further increase the adhesion of the foam layers 13b and 13b' to the back layer 11, the foam layers 13b and 13b' may further include a copolymer of vinyl chloride and vinyl acetate in an amount of 5 to 20 parts by weight or 5 to 15 parts by weight based on 100 parts by weight of the polyvinyl chloride resin. Within this range, the peel strength between the back layer 11 and the foam layers 13b and 13b' may be excellent.

Vinyl acetate may be included in an amount of 0.5 to 10% by weight or 1 to 5% by weight in the copolymer of vinyl chloride and vinyl acetate.

Alternatively, according to the present invention, the foam layers 13b and 13b' may be formed of a mixed resin prepared by mixing the polyvinyl chloride resin with one or more selected from the group consisting of thermoplastic polyurethane (TPU) resins, polyvinylidene chloride (PVDC) resins, polyvinylidene fluoride (PVDF) resins, chlorinated polyvinyl chloride (CPVC) resins, polyvinyl alcohol (PVA) resins, polyvinyl acetate (PVAc) resins, polyvinylbutyrate (PVB) resins, polyethylene (PE) resins, and polypropylene (PP) resins.

The plasticizer may include one or more selected from the group consisting of phthalate-based plasticizers, terephthalate-based plasticizers, and epoxy-based plasticizers.

A plasticizer, which is very compatible with the polyvinyl chloride resin, may be used as the phthalate-based plasticizer, and may include one selected from the group consisting of dibutylphthalate, diethylhexylphthalate, diisononylphthalate, diisodecylphthalate, and butylbenzylphthalate. Preferably, diisodecylphthalate, which is a low-volatility plasticizer, is used as the phthalate-based plasticizer.

The terephthalate-based plasticizer may be an environmentally friendly plasticizer, e.g., dioctyl terephthalate, without being limited thereto.

The epoxy-based plasticizer may be obtained by epoxidizing a double bond in an unsaturated fatty acid glycerol ester with hydrogen peroxide or peracetic acid. For example, epoxidized soybean oil or epoxidized linseed oil may be used as the epoxy-based plasticizer, without being limited thereto.

The plasticizer may be included in an amount of 60 to 120 parts by weight or 70 to 100 parts by weight based on 100 parts by weight of the polyvinyl chloride resin. When the content of the plasticizer is below the above range, processability and ductility may be degraded and microhardness may be increased. When the content of the plasticizer exceeds the above range, bleeding of a plasticizer may occur. Thus, to implement excellent ductility, the plasticizer is preferably included in an amount within the above range.

Any materials capable of forming fine bubbles that impart elasticity and thickness to the foam layers 13b and 13b' may be used as the foaming agent. For example, a chemical foaming agent, such as azodicarbonamide (ADCA), p,p'-oxybis(benzenesulfonyl hydrazide), p-toluenesulfonyl hydrazide, or sodium bicarbonate, may be used as the foaming agent.

The foaming agent may be included in an amount of 5 to 15 parts by weight or 5 to 10 parts by weight based on 100 parts by weight of the polyvinyl chloride resin. When the content of the foaming agent is below the above range, the ductility and cushioning of artificial leather may be degraded. When the content of the foaming agent exceeds the above range, an excess of foam cells may be generated in the foam layers 13b and 13b', thereby degrading surface physical properties and durability. Thus, the foaming agent is preferably used in an amount within the above range.

To adjust melt strength and physical properties, the foam layers 13b and 13b' may further include one or more selected from the group consisting of heat stabilizers, flame retardants, and fillers.

The foam layers 13b and 13b' may have a foaming rate of 100 to 500% or 150 to 300% after foaming at 220 to 230° C. Within this range, a sense of volume, cushioning, and smooth surface texture may be secured. When the foaming rate of the foam layers 13b and 13b' is below the above range, the microhardness of artificial leather may be increased, thereby hardening the artificial leather. When the foaming rate of the foam layers 13b and 13b' exceeds the above range, i.e., when foaming is excessively performed, the durability and strength of artificial leather may be weakened, thereby degrading physical properties. Thus, foaming is preferably performed so that the foam layers 13b and 13b' have a foaming rate within the above range.

Foam cells formed in the foam layers 13b and 13b' may be spherical foam cells. In this case, the spherical foam cells are contrast with foam cells distorted by external pressure or foam cells having a sharp shape, and the spherical shape does not necessarily mean a geometrically perfect spherical shape. In general, when describing an individual foam cell as having a spherical shape, the spherical shape should be understood as a comprehensive concept. Accordingly, in the present specification, a spherical foam cell should be understood as a foam cell that does not deform due to physical external force and maintains a spherical shape when forming.

In addition, 10 to 30 or 15 to 20 foam cells per unit area of 1 $mm^2$ in the side cross section or the horizontal cross section of the foam layers 13b and 13b' may be included. When the density of the foam cells is below the above range, ductility and cushioning may be degraded. When the density of the foam cells exceeds the above range, surface durability and physical properties, such as surface texture and cushioning, may be degraded. Thus, the foam cells are preferably formed at a density within the above range.

When the number of foam cells was measured, artificial leather was cut in the vertical direction or the horizontal direction, and the number of foam cells formed in a unit area of 1 mm$^2$ in the side cross section or the horizontal cross section of the foam layers 13b and 13b' was measured using an optical microscope.

In addition, the foam cells may have an average diameter of 120 to 250 μm or 135 to 200 μm. Here, the average diameter refers to an average value of diameters that one foam cell may have. More specifically, when the foam cells are geometrically spherical, the average diameter means the average of diameters, and when the foam cells have a shape other than a spherical shape, the average diameter means the average length of long axes when a long axis and a short axis are divided.

When the foam cells have an average diameter within the above range and the foam cells maintain a spherical shape, the ductility, processability, and cushioning of the artificial leather may be improved.

When the average diameter of the foam cells was measured, artificial leather was cut in the vertical direction or the horizontal direction, and the average diameter of foam cells formed in a unit area of 1 mm$^2$ in the side cross section or the horizontal cross section of the foam layers 13b and 13b' was measured based on the scale bar of an optical microscope.

In addition, the foam layers 13b and 13b' may have a specific gravity of 0.7 to 0.9 or 0.7 to 0.8. When the specific gravity of the foam layers 13b and 13b' is below the above range, durability may be degraded. When the specific gravity of the foam layers 13b and 13b' exceeds the above range, ductility and cushioning may be degraded. Thus, the foam layers 13b and 13b' preferably have a specific gravity within the above range.

That is, spherical foam cells in the foam layers 13b and 13b' are not deformed by external pressure, 10 to 30 foam cells per unit area of 1 mm$^2$ in the side cross section or the horizontal cross section of the foam layers may be included, and the specific gravity of the foam layers may be 0.7 to 0.9. Accordingly, significantly improved cushioning and smooth surface texture may be implemented.

In addition, the foam layers 13b and 13b' may have a thickness of 0.4 to 0.8 mm or 0.4 to 0.7 mm. When the thickness of the foam layers is below the above range, cushioning may be degraded. When the thickness of the foam layers exceeds the above range, the foam layers 13b and 13b' may be thicker than necessary, which increases material cost.

Skin Layer 15

According to the present invention, the skin layer 15 serves to secure surface smoothness and implement color, and may include 60 to 120 parts by weight of a plasticizer and a pigment based on 100 parts by weight of a polyvinyl chloride resin.

Preferably, the degree of polymerization of a polyvinyl chloride resin included in the skin layer 15 is higher than that of a polyvinyl chloride resin included in the foam layers 13b and 13b'. Thereby, the skin layer 15 may be prevented from bursting during step S8 (foam molding step) or step S13 (embossing molding step) to be described later.

Specifically, a straight polyvinyl chloride resin prepared by suspension polymerization may be used as the polyvinyl chloride resin included in the skin layer 15.

The polyvinyl chloride resin may have a degree of polymerization of 1,250 to 3,000 or 1,250 to 2,000. When the degree of polymerization of the polyvinyl chloride resin is below the above range, the skin layer 15 may be burst during step S8 (foam molding step) or step S13 (embossing molding step) to be described later. When the degree of polymerization of the polyvinyl chloride resin exceeds the above range, surface texture and ductility may be degraded. Thus, the polyvinyl chloride resin having a degree of polymerization within the above range is preferably used.

In addition, to adjust melt strength and physical properties, the skin layer 15 may further include one or more selected from the group consisting of heat stabilizers, flame retardants, and fillers.

Plasticizers, heat stabilizers, flame retardants, and fillers included in the skin layer 15 may be the same as those included in the foam layers 13b and 13b'.

The skin layer 15 may have a thickness of 100 to 300 μm or 120 to 200 μm. When the thickness of the skin layer 15 is below the above range, surface smoothness and processability may be degraded, and the amount of pigment added to implement color may be increased, leading to increase in material cost. When the thickness of the skin layer 15 exceeds the above range, cushioning of artificial leather may be degraded, and the skin layer 15 may be thicker than necessary, which increases material cost.

Surface Treatment Layer 17

According to the present invention, the surface treatment layer 17 may be formed by applying a water-based surface treatment agent to the upper surface of the skin layer 15 and performing drying.

The water-based surface treatment agent may include a main material A; a curing agent B including one or more functional groups selected from the group consisting of an aziridine group, an isocyanate group, and a carbodiimide group per molecule; a water-based solvent C; and a silicon compound D.

The main material A is described in detail as follows.

Main Material A-1

For example, in the present invention, the main material A-1 may be prepared by dispersing, in a water-based solvent, a polyurethane having one or more functional groups selected from the group consisting of a carboxylic acid group, a hydroxyl group, an amino group, and a combination thereof per molecule.

Among the above-mentioned polyurethanes, as an example of a method of preparing a polyurethane having a carboxylic acid group, there is a method of performing urethanation using a compound having a carboxylic acid group as a raw material. For example, the compound having a carboxylic acid group used as a raw material for the polyurethane may include 2,2'-dimethylol propionic acid, 2,2'-dimethylol butanoic acid, 2,2'-dimethylol butyric acid, 2,2'-dimethylol pentanoic acid, and the like.

In addition, among the above-mentioned polyurethanes, as an example of a method of preparing a polyurethane having a hydroxyl group, there is a method of obtaining a polyurethane having a hydroxyl group at the terminal thereof by reacting an excess of a polyol and/or glycol with polyisocyanate. For example, a compound having a hydroxyl group used as a raw material for the polyurethane may include polyolefin polyols, such as polyester polyols, polyether polyols, polycarbonate polyols, polyacetal polyols, polyacrylate polyols, polyester amide polyols, polythioether polyols, and polybutadiene polyols.

In addition, among the above-mentioned polyurethanes, as an example of a method of preparing a polyurethane having an amine group, there is a method of obtaining a polyurethane having an amine group by reacting a urethane prepolymer having an isocyanate group at the terminal thereof with an aminoalcohol, such as 2-ethanolamine, 2-aminoethyl ethanolamine, and diethanolamine, an aminophenol or the like.

Preferably, a polycarbonate-based polyurethane using the polycarbonate polyol having excellent heat resistance and light resistance as a raw material is used as the polyurethane.

According to the present invention, the content of the polyurethane in the main material A-1 may be 5 to 30% by weight or 10 to 25% by weight. When the content of the polyurethane is below the above range, feel, scratch resistance, light resistance, heat resistance, wear resistance, and solvent resistance may be degraded. When the content of the polyurethane exceeds the above range, whitening and smudges may occur. Thus, the polyurethane is preferably included in an amount within the above range.

Whitening, a type of color defect, refers to a phenomenon in which white dots appear on the surface of artificial leather after application of the water-based surface treatment agent.

Main Material A-2

As another example, the main material A may be a main material A-2 prepared by dispersing, in a water-based solvent, an acrylic-modified polyurethane further including an acrylate in the main chain thereof.

The content of the acrylic-modified urethane in the main material A-2 may be 1 to 10% by weight or 2 to 8% by weight. When the content of the acrylic-modified urethane is below the above range, contamination resistance may be degraded, and texture may be slippery. When the content of the acrylic-modified urethane exceeds the above range, ductility may be degraded, and texture may be dry. Thus, the acrylic-modified urethane is preferably included in an amount within the above range.

In addition, the main material A-2 may further include a siloxane to facilitate water dispersion in the acrylic-modified polyurethane and to improve antifouling properties.

Preferably, the siloxane includes one or more methyl groups to secure antifouling properties, excellent compatibility with the acrylic-modified polyurethane, and excellent hardness.

The siloxane may be included in an amount of 0.01 to 2% by weight or 0.05 to 1.5% by weight in the main material A-2. When the content of the siloxane is below the above range, antifouling properties may be degraded. When the content of the siloxane exceeds the above range, the siloxane may migrate to the surface of artificial leather, resulting in excessive gloss of the surface of the artificial leather. In addition, when the surface of the artificial leather is rubbed by one's hand, the hand may be stained with the siloxane. Thus, the siloxane is preferably included in an amount within the above range.

Main Material A-3

As yet another example, the main material A of the present invention may be obtained by mixing the main material A-1 and the main material A-2.

The main material A-1 and the main material A-2 may be mixed in a weight ratio of 1:9 to 4:6, or 2:8 to 3:7. When the content of the main material A-1 is below the above range, the surface texture of artificial leather may not be soft. When the content of the main material A-1 exceeds the above range, antifouling properties may be degraded. Thus, the main material A-1 and the main material A-2 are preferably mixed in a ratio within the above range.

Curing Agent B

The curing agent B may include one or more functional groups selected from the group consisting of an aziridine group, an isocyanate group, and a carbodiimide group per molecule.

Specifically, the compound having an aziridine group refers to a compound including a hetero tricyclic ring composed of two carbon atoms and one nitrogen atom, and may include one or more compounds selected from the group consisting of 3-(3-methoxyphenyl)-3-(trifluoromethyl)-diaziridine; 3-(trifluoromethyl)-3-phenyldiaziridine; propane-2,2-diyldibenzene-4,1-diyl diaziridine-1-carboxylate; 1,1'-(butylphosphoryl)diaziridine; oxydiethane-2,1-diyldiaziridine-1-carboxylate; 3,3-bis(1,1-difluoro-hexyl)-[1,2]diaziridine; 1-aziridinepropanoicacid; 2-methyl-2-[[3-(2-methyl-1-aziridinyl)-1-oxopropoxy]methyl]-1,3-propanediylester; 2-ethyl-2-[[3-(2-methyl-1-aziridinyl)-1-oxopropoxy]methyl]-1,3-propanediylester; 2-ethyl-2-[[3-(2-methyl-1-aziridinyl)-1-oxopropoxy]methyl]-1,3-propanediylbis(2-methyl-1-aziridinepropanoate); pentaerythritol tris[3-(1-aziridinyl)propionate]; pentaerythritol tris(3-aziridinopropionate); and combinations thereof.

For example, the compound having an isocyanate group may include one or more selected from the group consisting of toluene diisocyanate, diphenylmethane diisocyanate, modified diphenylmethane diisocyanates, naphthalene diisocyanate, phenylene diisocyanate, hexamethylene diisocyanate, lysine isocyanate, cyclohexane diisocyanate, 3-isocyanatomethyl-3,5,5-trimethylcyclohexyl isocyanate, isophorone diisocyanate, methylenediphenyl isocyanate, xylene diisocyanate, tetramethylxylene diisocyanate, norbornene diisocyanate, triphenylmethane triisocyanate, polyphenyl polymethylene polyisocyanate, polyisocyanates including a carbodiimide group, polyisocyanates including an allophanate group, polyisocyanates including an isocyanurate group, and combinations thereof.

The compound having a carbodiimide group may include polycarbodiimides.

The curing agent B may be included in an amount of 1 to 25 parts by weight, 5 to 20 parts by weight, or 10 to 20 parts by weight based on 100 parts by weight of the main material A. When the content of the curing agent B is below the above range, incomplete curing may occur, thereby degrading physical properties such as light resistance, heat resistance, scratch resistance, wear resistance, solvent resistance, and hydrolysis resistance. When the content of the curing agent B exceeds the above range, raw material cost may increase. Thus, the curing agent B is preferably included in an amount within the above range.

Water-Based Solvent C

The water-based solvent C may include water, an alcohol, or a mixture thereof.

In addition, the alcohol may include one or more selected from the group consisting of methanol, ethanol, propanol, and butanol. Due to the presence of the alcohol, reaction stability and stability of a water-based surface treatment agent may be ensured when components constituting the water-based surface treatment agent are mixed.

Due to the presence of the water-based solvent C, an interpenetrating polymer network in which the main material A and a curing agent not participating in three-dimensional crosslinking reaction are entangled with each other may be formed. In addition, the amount of volatile organic compounds (VOCs) generated by use of organic solvents may be reduced, and as a result, the amount of odor substances released from the VOCs may be reduced.

The water-based solvent C may be included in an amount of 1 to 25 parts by weight, 5 to 20 parts by weight, or 10 to 20 parts by weight based on 100 parts by weight of the main material A.

Silicon Compound D

The silicon compound D may be a polysiloxane of a liquid form dispersed in water or a polysiloxane of a bead form. Preferably, to improve surface texture, the silicon compound D is a polysiloxane in a liquid form dispersed in water.

In the silicon compound of a liquid form, a polysiloxane may be included in an amount of 5 to 30% by weight or 10 to 20% by weight.

The silicon compound D may be included in an amount of 1 to 15 parts by weight, 1 to 10 parts by weight, or 5 to 7 parts by weight based on 100 parts by weight of the main material A.

When the content of a polysiloxane in the silicon compound is below the above range, and when the content of the silicon compound mixed with the main material is below the above range, antifouling properties may be degraded. When the content of a polysiloxane exceeds the above range, and when the content of the silicon compound exceeds the above range, surface texture may be excessively slippery. As a result, although a squeak index may be minimized, a proper level of coefficient of kinetic friction may not be obtained, resulting in poor seating feeling. Thus, the content of a polysiloxane and the content of the silicon compound are preferably used within the above range.

Additives

The water-based surface treatment agent may further include an antifoaming agent and a leveling agent.

Since the water-based surface treatment agent has a higher viscosity than an oil-based surface treatment agent, the antifoaming agent is included to prevent generation of a large number of bubbles during coating. For example, the antifoaming agent may be selected from a silicon resin, a surfactant, paraffin wax, or mineral oil, without being limited thereto.

The antifoaming agent may be included in an amount of 0.1 to 0.5 parts by weight based on 100 parts by weight of the main material A. Within this range, coating properties and physical properties may be excellent.

The leveling agent is added to provide a uniform coating surface, and may be selected from a silicon resin or an acryl resin, without being limited thereto.

The leveling agent may be included in an amount of 1 to 5 parts by weight based on 100 parts by weight of the main material A. Within this range, coating properties and physical properties may be excellent.

According to the present invention, the water-based surface treatment agent may further include one or more selected from the group consisting of urethane beads, acryl beads, and fluorinated wax.

When one or more selected from the group consisting of the urethane beads, the acryl beads, and the fluorinated wax are included, antifouling properties may be implemented by hydrophobicity, and the surface tension of the water-based surface treatment agent may be reduced, thereby increasing slippery texture.

One or more selected from the group consisting of the urethane beads, the acryl beads, and the fluorinated wax may be included in an amount of 1 to 10% by weight, preferably 2 to 5% by weight, in the water-based surface treatment agent. Within this range, dyeing of the water-based surface treatment agent by other substances, such as dyes, may be prevented, and the effect of reducing surface energy may be easily realized.

In addition, depending on the role of the water-based surface treatment agent, the water-based surface treatment agent may include one or more selected from surfactants, cosolvents, modifiers, quenchers, brighteners, thickeners, and quenchers, and the kind and content thereof are not particularly limited.

The water-based surface treatment agent having the above-described composition may have a viscosity of 150 to 700 cps or 200 to 600 cps at 25° C. When the viscosity of the water-based surface treatment agent is below the above range, the texture of artificial leather may not be soft and may be relatively stiff. In addition, a coating solution may flow down, thereby reducing coating efficiency. When the viscosity of the water-based surface treatment agent exceeds the above range, it is difficult to perform gravure coating. Thus, the water-based surface treatment agent having a viscosity within the above range is preferably used.

The viscosity of the water-based surface treatment agent is higher than that of a conventional oil-based surface treatment agent, and the upper surface of a skin layer may be easily coated with the water-based surface treatment agent.

The water-based surface treatment agent may be prepared by a method of preparing a water-based surface treatment agent including (a) a step of adding the curing agent B to the water-based solvent C and performing stirring; and (b) a step of adding the mixture stirred in step (a) to the main material A and performing stirring.

The descriptions of the main material A, the curing agent B, and the water-based solvent C are the same as described above, and thus repeated description thereof will be omitted.

Step (a) may be a step of performing stirring at 20 to 25° C. for 40 minutes to 5 hours or 1 to 3 hours.

In addition, in step (a), when the stirring time is below the above range, since the water-based solvent C and the curing agent B are not sufficiently stirred, the unreacted curing agent B upon mixing with the main material A in step (b) may react rapidly with the main material A, causing a shocking phenomenon. As a result, surface crosslinking density may be reduced, workability may be degraded, and whitening may occur on the surface of artificial leather. Thus, stirring is preferably performed for the above time range.

In addition, when the water-based solvent C is added to the curing agent B, viscosity may rapidly increase prematurely, thereby decreasing surface crosslinking density, degrading light resistance, heat resistance, and scratch resistance, and causing whitening. Thus, preferably, the curing agent C is added to the water-based solvent C.

Step (b) may be a step of performing stirring at 20 to 25° C. for 0.2 to 1 hour or 0.3 to 0.8 hours.

In the water-based surface treatment agent prepared using the above-described method, by adding the curing agent B to the water-based solvent C, performing stirring sufficiently, and then mixing the mixture with the main material A, an interpenetrating polymer network in which a curing agent not participating in three-dimensional crosslinking reaction is entangled may be formed between polyurethane in the main material A. Accordingly, the antifouling properties of a surface treatment layer may be improved, and the surface crosslinking density of the surface treatment layer may be increased while reducing surface tension.

According to the present invention, the surface treatment layer 17 formed using the water-based surface treatment agent may have a surface crosslinking density of 70 to 98% or 75 to 95%. Within this range, infiltration of contaminants into a surface treatment agent may be prevented, thereby improving antifouling properties.

In addition, the surface treatment layer 17 may have a surface tension of 90 to 1300 or 95 to 1200. Within this range, compared to a surface treatment layer formed using an oil-based surface treatment agent, the surface treatment layer 17 may have excellent antifouling properties.

The surface treatment layer 17 may have a thickness of 4 to 30 µm or 10 to 20 µm. Within this range, contamination resistance may be secured while maintaining the flexibility of artificial leather. When the thickness of the surface treatment layer 17 is below the above range, the surface treatment layer 17 becomes too thin, resulting in poor durability. When the thickness of the surface treatment layer 17 exceeds the above range, the amount of a water-based surface treatment agent to be added may be increased, thereby increasing material cost. Thus, the surface treatment layer 17 is preferably formed to have a thickness within the above range.

The artificial leather of the present invention including the surface treatment layer 17 may have a squeak index of less than 0.15 and a coefficient of kinetic friction of 0.2 to 0.5. Accordingly, the artificial leather may satisfy both squeak index and coefficient of kinetic friction.

Specifically, the squeak index is a value of noise generated by friction between artificial leather and the human body, i.e., a passenger. The artificial leather of the present invention may have a squeak index of less than 0.15, or 0.14 or less. Within this range, noise may be reduced, and surface texture may be soft. When the squeak index of the artificial leather exceeds the above range, noise may be severe, and stick slip, which is a friction phenomenon accompanied by vibration, may be enhanced. Thus, the artificial leather is preferably manufactured to have a squeak index within the above range.

When measuring a squeak index using a universal testing machine, an artificial leather specimen is folded up and down and is pressed with a weight of 4.5 kg, and a force deviation (ΔF) and average force (Fa) required to pull the specimen at a speed of 100 mm/min are measured. Then, a squeak index is calculated by a formula of ΔF/Fa.

In addition, the coefficient of kinetic friction (µ) is a coefficient associated with force that prevents slipping when one object slides in contact with another object. The artificial leather of the present invention may have a coefficient of kinetic friction of 0.2 to 0.5 or 0.25 to 0.5. When the coefficient of kinetic friction of the artificial leather is below the above range, slipping may not be prevented, resulting in poor seating feeling. When the coefficient of kinetic friction of the artificial leather exceeds the above range, a squeak index may be increased due to friction between artificial leather and a passenger. Thus, the artificial leather is preferably manufactured to have a coefficient of kinetic friction within the above range.

When measuring a coefficient of kinetic friction using a universal testing machine, an artificial leather specimen is folded up and down and is pressed with a weight of 4.5 kg (W), and average force (Fa) required to pull the specimen at a speed of 300 mm/min is measured. Then, a coefficient of kinetic friction is calculated by a formula of Fa/W.

In addition, in the artificial leather of the present invention including the surface treatment layer 17, the amount of volatile organic compounds generated may be 500 µg/m² or less, or 400 µg/m² or less. The lower limit of the amount of volatile organic compounds generated is not limited. For example, the amount of volatile organic compounds generated may be 0 µg/m². Within this range, an eco-friendly effect may be obtained.

The volatile organic compounds refer to hydrocarbon compounds which easily evaporate into the atmosphere to generate odor or ozone. When measuring the amount of volatile organic compounds generated, an artificial leather specimen is prepared. The specimen is placed in a 4 L glass desiccator, and the desiccator is sealed, followed by heating in an oven for 2 hours. After heating, the desiccator is left in a laboratory at 25° C. for 1 hour. Then, the lid of the desiccator is opened about 3 to 4 cm, and volatile organic compounds emitted from the specimen are collected. The amount of the collected volatile organic compounds is measured using a measurement apparatus.

In addition, the antifouling properties of the artificial leather of the present invention including the surface treatment layer 17 may be less than 10%, or 7% or less. The lower limit thereof is not limited. For example, the antifouling properties of the artificial leather may be above 1%, or 2% or more. Within this range, contamination resistance may be excellent.

Embossed Pattern 19

The embossed pattern 19 is formed on the upper surfaces of the skin layer 15 and the surface treatment layer 17 through vacuum adsorption molding, and more specifically, may refer to prominences and depressions (凹凸) formed on the top of artificial leather.

In the artificial leather of the present invention, the thickness difference between portions of the surface treatment layer respectively formed on each of valleys 19a and each of crests 19b of the embossed pattern 19 may be less than 5 µm or 3 µm or less, or a ratio of the thickness of a portion of the surface treatment layer formed on the crest 19b of the embossed pattern 19 to the thickness of a portion of the surface treatment layer formed on the valley 19a of the embossed pattern 19 (i.e., the thickness of a portion of the surface treatment layer formed on a crest/the thickness of a portion of the surface treatment layer formed on a valley) may be 0.7 to 1 or 0.8 to 1. Within this range, since difference in gloss in portions of the surface treatment layer respectively formed on each valley and each crest is small, a surface does not appear mottled. Accordingly, artificial leather having excellent appearance may be provided.

Areas where the thickness difference or thickness ratio between portions of the surface treatment layer respectively formed on each valley 19a and each crest 19b of the embossed pattern 19 satisfies the above range may occupy 80% or more or 90% or more of the total surface of the artificial leather.

In the present invention, the valley of the embossed pattern refers to a depression (凹) of prominences and depressions (凹凸), i.e., the lowest point, and the crest of the embossed pattern refers to a prominence (凸), i.e., the highest point (see FIG. 4).

When the thicknesses of portions of the surface treatment layer formed on the valleys 19a and the crests 19b are measured, the artificial leather is cut in the vertical direction, and thickness is measured using a high magnification optical microscope.

Referring to FIG. 2, the present invention relates to a method of manufacturing artificial leather, the method including:

step S1 of preparing a back layer formed of woven fabric or nonwoven fabric;

step S3 of separately forming a pre-foam layer or foam layer and a skin layer by molding;

step S5 of laminating the back layer on the lower surface of the pre-foam layer or foam layer;

step S7 of laminating the skin layer on the upper surface of the pre-foam layer or foam layer on which the back layer is formed;

step S9 of coating the upper surface of the skin layer with a water-based surface treatment agent to form a surface treatment layer;

step S11 of irradiating the upper surface of the surface treatment layer with infrared light; and step S13 of forming an embossed pattern through vacuum adsorption molding on the upper surfaces of the skin layer and surface treatment layer heated by irradiation with infrared light.

wherein the artificial leather has a microhardness of 45 to 59, wherein the microhardness is a maximum value measured immediately after a needle is in contact with the artificial leather at an indentation speed of 1 mm/s in a peak hold mode using a microhardness tester (Micro durometer, Model name: MD-1 capa, Brand: ASKER), i.e., when the load holding time of the needle is 1 second.

In step S1, one surface of the back layer 11 may be coated with a coating solution. Specifically, by coating one surface of the back layer 11 with a coating solution, the peel strength between the back layer 11 and the foam layers 13b and 13b' formed on the upper surface of the back layer 11 may be increased.

Since the properties of the back layer 11 and the coating solution used to coat one surface thereof are the same as described above, overlapping descriptions are omitted.

Step S3 may be a step of extrusion molding or calendering molding a pre-foam layer 13a or a foam layer 13b and the skin layer 15.

In this case, extrusion molding may be a T-die extrusion process using a T-die extruder after separately melting a composition for preparing a pre-foam layer or a foam layer and a composition for preparing a skin layer in an extruder, and calendering molding may be a calendering process of separately kneading a composition for preparing a pre-foam layer or a foam layer and a composition for preparing a skin layer in a mixer and passing the compositions between calender rolls at 160 to 170° C.

Specifically, the pre-foam layer 13a is prepared in a sheet shape through extrusion molding or calendering molding, and then is foamed in step S8 (foam molding step) to be described later to form the foam layer 13b'. The pre-foam layer 13a may have a thickness of 0.2 to 0.35 mm or 0.25 to 0.3 mm.

In addition, the foam layer 13b is prepared in a sheet shape through extrusion molding or calendering molding, and foaming is completed by passing the foam layer 13b through an oven at 220 to 260° C.

Since the composition for preparing a pre-foam layer or a foam layer is the same as the composition of the above-described foam layers, repeated description thereof will be omitted.

In addition, since the composition for preparing a skin layer is the same as the composition of the above-described skin layer, repeated description thereof will be omitted.

Step S5 may be a step of thermally laminating the back layer 11 on the lower surface of the pre-foam layer 13a or the foam layer 13b.

Step S7 may be a step of forming a semi-finished product by thermally laminating the skin layer 15 on the upper surface of the pre-foam layer 13a or the foam layer 13b on which the back layer 11 has been laminated.

Specifically, when the back layer 11 having one coated surface is thermally laminated on the lower surface of the pre-foam layer 13a or the foam layer 13b, and then the skin layer 15 is laminated on the upper surface of the pre-foam layer 13a or the foam layer 13b on which the back layer 11 has been laminated, the mechanical strength of the back layer 11 may be excellent, and thus the physical properties of each layer may be ensured during a process. When the skin layer 15 is first laminated on the pre-foam layer 13a or the foam layer 13b, bubbles may be generated in the two layers (13a/13b, 15) during thermal lamination or curling such as bending of a layer may occur. Thus, preferentially, the back layer 11 having excellent mechanical strength is thermally laminated on the lower surface of the pre-foam layer 13a or the foam layer 13b.

In addition, in step S7, when the pre-foam layer 13a is used, step S8 (foam molding step) of forming a semi-finished product, in which the back layer 11; the foam layer 13b'; and the skin layer 15 are laminated, by foaming the pre-foam layer 13a by passing the pre-foam layer 13a through an oven at 220 to 230° C. after step S7 may be further included.

Step S9 may be a step of applying a water-based surface treatment agent onto the upper surface of the skin layer of the semi-finished product and performing drying to form a surface treatment layer. In this case, coating may be performed to form a single layer or two or more layers.

For single-layer coating, the above-described water-based surface treatment agent may be applied. For multilayer-coating, the above-described water-based surface treatment agent excluding a silicon compound may be applied onto a base, and the above-described water-based surface treatment agent may be applied onto the upper surface of the base.

Drying may be performed at 110 to 150° C. or 130 to 150° C. for 80 to 120 seconds. When drying time is below the above range, a water-based solvent may not be completely evaporated, and curing may not proceed completely. As a result, whitening may occur on the surface of artificial leather, and surface physical properties may be degraded. When drying time exceeds the above range, heat resistance may be degraded, causing discoloration. Thus, drying is preferably performed within the above temperature range and the above time range.

Since the configuration of the surface treatment layer 17 is the same as described above, repeated description thereof will be omitted.

Step S11 may be a step of radiating infrared light at 150 to 180° C. for 5 to 15 seconds or 10 to 15 seconds onto the surface of a semi-finished product on which the surface treatment layer of step S9 is formed. When infrared light radiation temperature and time are below the above ranges, since the skin layer 15 is not softened, an embossed pattern may not be clearly formed in step S13 (embossing molding step) to be described later. When infrared light radiation temperature and time exceed the above ranges, the skin layer 15 may melt. Thus, infrared light radiation is preferably performed within the above ranges.

For example, in step S11, process speed may be 10 to 20 m/min or 12 to 15 m/min. Specifically, when process speed is 15 m/min, infrared light is radiated for 14 seconds.

Step S13 may be a step of forming the embossed pattern 19 through vacuum adsorption molding, and may be performed under a vacuum pressure of 0.02 to 0.08 MPa or 0.04 to 0.07 MPa. When step S13 is performed under a vacuum pressure below the above range, the embossed pattern 19 may not be clearly formed, resulting in poor cushioning. When step S13 is performed under a vacuum pressure exceeding the above range, the surface treatment layer 17 may be damaged, or surface physical properties may be degraded. Thus, step S13 is preferably performed under a vacuum pressure within the above range.

In addition, step S13 may be performed at a temperature of 150 to 190° C. or 160 to 180° C. When step S13 is performed at a temperature below the above range, the embossed pattern 19 may not be sufficiently formed. When step S13 is performed at a temperature exceeding the above range, the surface physical properties of artificial leather may be degraded due to high temperature, and thus the surface thereof may be rough or torn. Thus, step S13 is preferably performed at a temperature within the above range.

In the method of manufacturing artificial leather according to the present invention, optionally, step S8 (foam molding step), step S9 (surface treatment layer-forming step), step S11 (infrared light-radiating step), and step S13 (embossing molding step) may be performed in an in-line manner.

In addition, optionally, in the surface treatment layer-forming step, instead of forming a surface treatment layer by applying a surface treatment agent onto the upper surface of the skin layer 15 of the semi-finished product, the upper surface of the skin layer 15 of the semi-finished product is irradiated with infrared light (S9'), the embossed pattern 19 is formed on the surface of the skin layer 15 of the heated semi-finished product through vacuum adsorption molding (S11'), and a surface treatment agent is applied onto the skin layer 15 to form the surface treatment layer 17 (S13'). Through this process, artificial leather may be manufactured (see FIG. 3).

The artificial leather of the present invention may have a texture similar to that of natural leather and may have a soft feel like natural leather.

The artificial leather of the present invention may have excellent peel strength.

In addition, the artificial leather of the present invention may implement excellent cushioning by preventing foam cells constituting foam layers from being distorted or damaged.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

1. Preparation of Artificial Leather

Example 1

(1) Back Layer 11
1) Preparation of Coating Solution
Based on 100 parts by weight of a mixed resin consisting of 75% by weight of a homopolymer of paste vinyl chloride and 25% by weight of a copolymer of vinyl chloride and vinyl acetate (content of vinyl acetate: 6% by weight), a coating composition including 100 parts by weight of a plasticizer and 3 parts by weight of a curing agent was completely stirred at room temperature to prepare a coating solution having a Zahn cup (cup #3) viscosity of 100 seconds at 25° C.

2) One surface of woven fabric containing cotton and a polyester in a ratio of 35:65 was coated with the prepared coating solution using a gravure coating method to form a coating layer having a thickness of 3 μm, and gelling was performed by heating at 130° C. to form a back layer having a thickness of 0.6 mm.

(2) Pre-Foam Layer 13a
Based on 100 parts by weight of a straight polyvinyl chloride resin having a degree of polymerization of 1,000, a composition for preparing a foam layer, the composition including 10 parts by weight of a copolymer of vinyl chloride and vinyl acetate (content of vinyl acetate: 3% by weight), 85 parts by weight of a plasticizer, 6 parts by weight of a foaming agent, and 2 parts by weight of a heat stabilizer was kneaded, and the kneaded raw materials were passed between calender rolls at 160 to 170° C. to form the pre-foam layer 13a having a thickness of 0.3 mm.

(3) Skin Layer 15
Based on 100 parts by weight of a straight polyvinyl chloride having a degree of polymerization of 1,300, a composition for preparing a skin layer, the composition including 95 parts by weight of a plasticizer, 2 parts by weight of a pigment, and 2 parts by weight of a heat stabilizer was kneaded, and the kneaded raw materials were passed between calender rolls at 160 to 170° C. to form a skin layer having a thickness of 150 μm.

Subsequently, the back layer 11 having one coated surface was thermally laminated on the lower surface of the pre-foam layer 13a, and then the skin layer 15 was thermally laminated on the upper surface of the pre-foam layer 13a on which the back layer 11 had been laminated.

Subsequently, by passing a semi-finished product, in which the back layer 11; the pre-foam layer 13a; and the skin layer 15 were laminated, through an oven at 220° C., foaming of the pre-foam layer 13a was performed. As a result, a semi-finished product in which the back layer 11; the foam layer 13b'; and the skin layer 15 were laminated was manufactured.

(4) Surface Treatment Layer 17
First, 5 parts by weight of a curing agent including hexamethylene diisocyanate and polyisocyanate was added to 20 parts by weight of a water-based solvent including 15 parts by weight of water and 5 parts by weight of isopropyl alcohol, and then stirring was performed at 25° C. for 1 hour.

In addition, as a silicon compound of a liquid form prepared by dispersing a polysiloxane in water, 5 parts by weight of a silicon compound including 75% by weight of water and 15% by weight of a polysiloxane, 0.2 parts by weight of an antifoaming agent, and 2 parts by weight of a leveling agent were added to 100 parts by weight of a polycarbonate-based polyurethane resin, as a main material, including 50% by weight of water and 20% by weight of a polyurethane.

Subsequently, 25 parts by weight of the mixture containing the curing agent and the water-based solvent was added to the mixture containing the main material and the additives, and then stirring was performed at 25° C. for 0.5 hours to prepare a water-based surface treatment agent.

Subsequently, the surface of the skin layer 15 was coated with the water-based surface treatment agent using gravure coating, and then drying was performed at 140° C. to evaporate the water-based solvent. As a result, the surface treatment layer 17 having a thickness of 15 μm was formed.

Subsequently, the surface of a semi-finished product, in which the back layer 11; the foam layer 13b'; the skin layer 15; and the surface treatment layer 17 were laminated from the bottom to the top, was irradiated with infrared light at 150 to 180° C. for 14 seconds to heat the surface of the semi-finished product at about 170° C.

(5) Formation of Embossed Pattern 19 Through Molding

The embossed pattern 19 was formed on the surfaces of the skin layer 15 and the surface treatment layer 17 under a vacuum pressure of 0.06 MPa through vacuum adsorption molding. Through these steps, manufacture of the artificial leather of the present invention was completed.

Example 2

A water-based surface treatment agent was prepared using the same composition and preparation method as in Example 1, except that a polycarbonate-based polyurethane resin, as a main material, including 60% by weight of water, 7% by weight of an acrylic-modified urethane, and 0.15% by weight of a siloxane was used. Artificial leather was manufactured in the same manner as in Example 1, except that a surface treatment layer was formed using the water-based surface treatment agent.

Example 3

A water-based surface treatment agent was prepared using the same composition and preparation method as in Example 1, except that a polycarbonate-based polyurethane resin, as a main material, containing the main material of Example 1 and the main material of Example 2 in a weight ratio of 2:8 was used. Artificial leather was manufactured in the same manner as in Example 1, except that a surface treatment layer was formed using the water-based surface treatment agent.

Comparative Example 1

Artificial leather was manufactured in the same manner as in Example 1, except that roll pressing was performed under a pressure of 4 MPa using embossing rolls having an embossing pattern to form an embossed pattern on the surface of the skin layer 15 heated by radiation of infrared light after step S8 (foam molding step), and a water-based surface treatment agent was applied onto the surface of the skin layer 15, on which the embossed pattern was formed, to form a surface treatment layer.

Reference Example 1

Artificial leather was manufactured in the same manner as in Example 1, except that one surface of the back layer 11 was not coated with a coating solution.

Reference Example 2

Artificial leather was manufactured in the same manner as in Example 1, except that a copolymer of vinyl chloride and vinyl acetate was not included in the pre-foam layer 13a.

Reference Example 3

Artificial leather was manufactured in the same manner as in Example 1, except that a polyvinyl chloride resin having a degree of polymerization of 1,300 was used as the polyvinyl chloride resin included in the pre-foam layer 13a and a polyvinyl chloride resin having a degree of polymerization of 1,500 was used as the polyvinyl chloride resin included in the skin layer 15.

Reference Example 4

Artificial leather was manufactured in the same manner as in Example 1, except that a polyvinyl chloride resin having a degree of polymerization of 900 was used as the polyvinyl chloride resin included in the skin layer 15.

Reference Example 5

Artificial leather including a surface treatment layer was manufactured in the same manner as in Example 1, except that 95% by weight of a urethane acrylate was used as the surface treatment agent applied onto the skin layer, and an oil-based surface treatment agent including 5% by weight of methylene dicyclohexyl diisocyanate was used as the curing agent.

Reference Example 6

Artificial leather including a surface treatment layer was manufactured in the same manner as in Example 1, except that the content of the silicon compound D in the water-based surface treatment agent was 0.5 parts by weight based on 100 parts by weight of the main material A.

Reference Example 7

Artificial leather including a surface treatment layer was manufactured in the same manner as in Example 1, except that the content of the silicon compound D in the water-based surface treatment agent was 20 parts by weight based on 100 parts by weight of the main material A.

Reference Example 8

Artificial leather including a surface treatment layer was manufactured in the same manner as in Example 1, except that, after the upper surface of the skin layer was coated with the water-based surface treatment agent, radiation of infrared light was not performed.

Reference Example 9

Artificial leather including a surface treatment layer was manufactured in the same manner as in Example 1, except that, when a water-based surface treatment agent was prepared, the curing agent B was added to the water-based solvent C and stirring was performed at 25° C. for 0.5 hours.

Reference Example 10

Artificial leather including a surface treatment layer was manufactured in the same manner as in Example 1, except that, when a water-based surface treatment agent was prepared, the water-based solvent C was added to the curing agent B.

Reference Example 11

Artificial leather including a surface treatment layer was manufactured in the same manner as in Example 1, except that the upper surface of the skin layer was coated with a water-based surface treatment agent, and then drying was performed at 100° C.

Reference Example 12

Artificial leather including a surface treatment layer was manufactured in the same manner as in Example 1, except that the silicon compound D was not included in a water-based surface treatment agent.

2. Measurement of Physical Properties of Artificial Leather (1) The microhardness, peel strength, ductility (softness), aesthetics (feel), firmness, bursting degree of skin layer, and surface appearance of the artificial leather of Example 1, Comparative Example 1, and Reference Examples 1 to 4 were measured, and the results are shown in Table 1 below.

Microhardness

When microhardness is measured, a maximum value is measured immediately after a needle is in contact with artificial leather at an indentation speed of 1 mm/s in a peak hold mode using a microhardness tester (Micro durometer, Model name: MD-1 capa, Brand: ASKER), i.e., when the load holding time of the needle is 1 second.

Peel Strength

The manufactured artificial leather was cut to obtain specimens having a width of 30 mm and a length of 150 mm. Five specimens were selected for each of the transverse and longitudinal directions. The bubble side of the specimen was impregnated with a solvent such as methyl ethyl ketone (MEK), and a skin (foam layer) and bubbles (back layer) were forcibly peeled off by 50 mm in parallel with the short side while taking care not to apply stress to the skin (foam layer).

After peeling, the specimen was allowed to stand at room temperature for 2 hours or more to volatilize the solvent sufficiently, the skin (foam layer) and the bubbles (back layer) were respectively fixed in the clamp of a tensile tester, and then a load at the time of peeling by 50 mm at 200 mm/min was calculated as the average value of maximum values.

Test results were averaged for five specimens.

Ductility

Ductility (softness) was measured at a temperature of 23±2° C. and a relative moisture of 50±5%. Five artificial leather specimens having a pi (π) value of 100 mm were prepared using a ductility measurement apparatus (SDL Atlas, ST300D), and the specimens were pressed with a ST300D apparatus and the degree of movement of a scale for 15 seconds was recorded. Based on these results, ductility was determined.

Aesthetics (Feel)

Experts touched artificial leather with their hands and evaluated relative softness.

(⊚: very soft, ○: soft, Δ: not soft)

Firmness

Artificial leather specimens having a width of 250 mm and a length of 200 mm were prepared. Five specimens were selected for each of the transverse and longitudinal directions. The specimen was placed on a horizontal plane so that the short side of the specimen was aligned with a SCALE baseline A.

Subsequently, the specimen was pressed with a pressing plate of the same size as the specimen and the specimen was slipped at a speed of 10 mm/second in the direction of the inclined surface. When one end of the specimen was in contact with the inclined surface, a position B of the other end was measured by a scale.

Firmness was represented by a moving distance (scale of B point) (mm). Firmness of the front and back sides of the specimens for the transverse and longitudinal directions was measured, and average values were calculated.

Bursting Degree of Skin Layer

After foaming, the bursting degree of the skin layer of a semi-finished product was evaluated by visual observation.

(⊚: burst, ○: partial burst, X: no burst)

Surface Appearance

1) The artificial leather was cut in the vertical direction, and the thicknesses of portions of a surface treatment layer respectively formed on each valley and each crest of an embossed pattern were measured using a high magnification optical microscope. The results are shown in Table below.

2) Surface appearance was evaluated based on the opinions of a panel consisting of 10 evaluators. The evaluators were asked whether there was difference in gloss of the valleys and crests of the embossed pattern 19 of the artificial leather specimen. When five or more evaluators said there was difference in gloss, it was evaluated that there was difference in gloss, which was marked by "X (poor appearance)". When less than five evaluators said there was difference in gloss, it was evaluated that there was no difference in gloss, which was marked by "○ (excellent appearance)".

Specifically, when measuring whether there was difference in gloss of the valleys and crests of the embossed pattern 19 of an artificial leather specimen, the position of the artificial leather specimen was adjusted so that the direction of light (light source) was perpendicular to the artificial leather specimen and an evaluator's line of sight. In this case, the artificial leather specimen was placed parallel to the evaluator's line of sight.

Thereafter, while repeatedly tilting the artificial leather specimen at 30 to 60° based on incident light, it was evaluated whether there was gloss difference based on the valleys of the embossed pattern 19 (see FIG. 5).

In this case, when measuring whether there was gloss difference, the distance between an artificial leather specimen and the evaluator's eye was 30 cm or less.

(○: The thickness of a surface treatment layer is uniform, thus showing excellent appearance; and X: The thickness of a surface treatment layer is not uniform, and a surface looks mottled)

TABLE 1

|  | Example 1 | Comparative Example 1 | Reference Example 1 | Reference Example 2 | Reference Example 3 | Reference Example 4 |
|---|---|---|---|---|---|---|
| Microhardness | 54 | 66 | 54 | 54 | 63 | Not measurable |
| Peel strength [kgf/30 mm] | 3 | 3 | 2 | 2.1 | 3 | 3 |

TABLE 1-continued

| | Example 1 | Comparative Example 1 | Reference Example 1 | Reference Example 2 | Reference Example 3 | Reference Example 4 |
|---|---|---|---|---|---|---|
| Ductility (softness) | 3.8 | 3.3 | 3.8 | 3.8 | 3.2 | Not measurable |
| Aesthetics (feel) | ◎ | Δ | ◎ | ◎ | Δ | Not measurable |
| Firmness (mm) | 52 | 76 | 52 | 55 | 73 | Not measurable |
| Burst of skin layer | X | X | X | X | X | ◎ |
| Thicknesses of portions of surface treatment layer of valley and crest of embossed pattern (μm) | 15/15 | 15/10 | 15/15 | 15/15 | 15/15 | Not measurable |
| Surface appearance | ○ | X | ○ | ○ | ○ | Not measurable |

As shown in Table 1, it can be confirmed that, compared to the artificial leather of Comparative Example 1 having an embossed pattern formed through roller pressing rather than vacuum adsorption, the artificial leather of Example 1 according to the present invention has low microhardness, high ductility, and a soft feel. These results indicate that the artificial leather of Example 1 is excellent in aesthetics. In addition, it can be confirmed that, compared to the artificial leather of Comparative Example 1, the artificial leather of Example 1 according to the present invention has low firmness. This result indicates that the artificial leather of Example 1 has high flexibility.

In particular, in the artificial leather of Comparative Example 1, since an embossed pattern is formed, and then a surface treatment layer is formed, the thickness of a surface treatment agent applied to the valleys and crests of the embossed pattern is not constant, resulting in a large difference in gloss of the valleys and crests of the embossed pattern. As a result, the surface of the artificial leather of Comparative Example 1 looks mottled.

In addition, it can be confirmed that, compared to the artificial leather of Reference Example 1 in which a back layer is not coated and the artificial leather of Reference Example 2 not including a copolymer of vinyl chloride and vinyl acetate as a composition for preparing a pre-foam layer, the artificial leather of Example 1 according to the present invention in which one surface of a back layer is coated with a coating solution has excellent peel strength.

In addition, it can be confirmed that, compared to the artificial leather of Reference Example 3, wherein the degree of polymerization of a polyvinyl chloride resin included in a foam layer is greater than that of the polyvinyl chloride resin of the present invention, the artificial leather of Example 1 according to the present invention has low microhardness, high ductility, and a soft feel. These results indicate that the artificial leather of Example 1 is excellent in aesthetics.

In addition, in the case of the artificial leather of Reference Example 4, wherein the degree of polymerization of a polyvinyl chloride resin included in a skin layer is lower than that of a polyvinyl chloride resin included in a foam layer, bursting of the skin layer occurs during foaming.

(2) For artificial leather manufactured in Examples 1 to 3 and Reference Examples 5 to 12, coefficient of kinetic friction, squeak index, antifouling properties, amount of volatile organic compounds (VOCs) generated, surface crosslinking density, surface tension, viscosity, odor, and whitening were measured, and the results are shown in Table 3 below.

Coefficient of Kinetic Friction

When measuring a coefficient of kinetic friction using a universal testing machine, an artificial leather specimen was folded up and down and was pressed with a weight of 4.5 kg (W), and average force (Fa) required to pull the specimen at a speed of 300 mm/min was measured. Then, a coefficient of kinetic friction was calculated by a formula of Fa/W.

Squeak Index

When measuring a squeak index using a universal testing machine, an artificial leather specimen was folded up and down and was pressed with a weight of 4.5 kg, and a force deviation (ΔF) and average force (Fa) required to pull the specimen at a speed of 100 mm/min were measured. Then, a squeak index was calculated by a formula of ΔF/Fa.

Antifouling Properties

Artificial leather was mounted on a universal wear tester (Toyoseiki), cotton soil test cloth was placed on the upper surface of the artificial leather, and a constant load of 0.9 kg was applied thereto.

At this time, by applying a pressure of 0.14 kgf/cm$^2$ to a rubber diaphragm, the automobile seat was contaminated with 500 cycles, and after replacing the contaminated cloth, the automobile seat was contaminated with 500 cycles again.

The contaminated automobile seat was placed in the opening of a colorimeter, a green filter was mounted, and a reflection value at an uncontaminated region of artificial leather was measured. A reflection value (%) was measured in an intermediate polished portion between the center and outside of a contaminated region, and the average value (%) for contamination was calculated.

Amount of Volatile Organic Compounds (VOCs) Generated

When measuring the amount of volatile organic compounds (VOCs) generated, an artificial leather specimen was prepared. The specimen was placed in a 4 L glass desiccator, and the desiccator was sealed, followed by heating in an oven for 2 hours. After heating, the desiccator was left in a laboratory at 25° C. for 1 hour. Then, the lid of the desiccator was opened about 3 to 4 cm, and VOCs emitted from the specimen were collected. The amount of the collected VOCs was measured using a measurement apparatus.

Surface Crosslinking Density

Surface crosslinking density was determined by measuring the amount of crosslinked urethane that was insoluble in boiling xylene or decahydronaphthalene. Specifically, an artificial leather specimen (m1) was weighed up to 1 mg using a chemical balance, and the specimen was placed on a net or a container made of a perforated metal plate. Subsequently, the container was soaked in boiling xylene or decahydronaphthalene and was left for 6 to 8 hours.

Thereafter, the container containing residues was taken out of the boiling solvent, cooled to room temperature and dried, and a residual amount (m2) was weighed up to 1 mg.

Surface crosslinking density (%) G was calculated by a formula of m2/m1×100.

Surface Tension (Dyne Test)

Referring to FIGS. 6 and 7, when spreading a liquid having a specific tension of 20 to 600 on artificial leather using a pen (dyne pen) containing the liquid, when the tension of the liquid is greater than the surface tension of the artificial leather, the liquid does not spread on the artificial leather, and the liquid is condensed to maintain the spherical shape. When the tension of the liquid is less than the surface tension of the artificial leather, the liquid spreads flat and is easily applied onto the artificial leather.

At this time, the internal angle (θ) of the liquid 100 is measured.

The angle is inversely proportional to the surface tension of artificial leather.

Viscosity

Viscosity was measured using a Brookfield viscometer.

First, a specimen was warmed to a temperature of 25° C., the specimen was placed in a cylindrical container having a volume of 600 ml or more and a wide bottom, and the spindle #64 was positioned at the center of the container.

Subsequently, a viscometer was slowly lowered so that the viscometer was immersed to a marked position of a spindle, and the spindle was rotated at 30 rpm to measure viscosity.

Odor

According to a sensory test method, a panel of three or more evaluators directly smelled and evaluated the degree of odor. In Table 2 below, the degree of odor according to direct sensory evaluation is shown. The levels of odor are divided into 6 levels from level 1 to level 6. As the level increases, the severity of odor increases.

TABLE 2

| Odor level | Odor expression |
|---|---|
| 1 | No odor |
| 2 | Difficult to sense odor |
| 3 | Possible to sense odor, but odor is not severe enough to cause disgust |
| 4 | Easy to sense odor, and odor causes slight disgust. |
| 5 | Odor is severe enough to cause disgust. |
| 6 | Irritating and strong odor |

Whitening

The presence or absence of white dots generated on the surface of artificial leather was visually confirmed.
(○: whitening occurs, X: no whitening)

TABLE 3

| | Example 1 | Example 2 | Example 3 | Reference Example 5 | Reference Example 6 | Reference Example 7 | Reference Example 8 | Reference Example 9 | Reference Example 10 | Reference Example 11 | Reference Example 12 | Reference value |
|---|---|---|---|---|---|---|---|---|---|---|---|---|
| Coefficient of kinetic friction | 0.3 | 0.25 | 0.3 | 0.3 | 0.35 | 0.15 | 0.15 | 0.15 | 0.15 | 0.1 | 0.4 | 0.2-0.5 |
| Squeak index | 0.1 | 0.1 | 0.1 | 0.1 | 0.20 | 0.05 | 0.1 | 0.1 | 0.1 | 0.05 | 0.3 | Less than 0.15 |
| Antifouling properties (%) | 5 | 4.5 | 4.9 | 10 | 7 | 5 | 5 | 7 | 7 | 5 | 8 | — |
| Amount of VOCs generated (μg/m²) | 220 | 220 | 220 | 800 | 220 | 220 | 220 | 220 | 220 | 220 | 220 | — |
| Surface crosslinking density (%) | 80 | 85 | 82 | 90 | 78 | 80 | 80 | 70 | 70 | 75 | 75 | — |
| Surface tension (°) | 107.5 | 107.5 | 107.5 | 83.4 | 100 | 107.5 | 107.5 | 100 | 100 | 105 | 90 | — |
| Viscosity [cps] | 400 | 400 | 400 | 80 | 400 | 400 | 400 | 400 | 400 | 400 | 400 | — |
| Odor (level) | 3 | 3 | 3 | 4 | 3 | 3 | 3 | 3 | 3 | 3 | 3 | — |
| Whitening | X | X | X | X | X | X | X | ○ | ○ | ○ | X | — |

As shown in Table 3, compared to the artificial leather of Reference Example 5 including a surface treatment layer formed using an oil-based surface treatment agent, since the artificial leather of Examples 1 to 3 according to the present invention includes a surface treatment layer formed using a water-based surface treatment agent, the artificial leather of Examples 1 to 3 has excellent antifouling properties. In addition, in the case of the artificial leather of Examples 1 to 3, the amount of VOCs generated is significantly reduced, odor is not severe, and viscosity is high, indicating that the upper surface of a skin layer is well coated. In addition, since the artificial leather of Examples 1 to 3 according to the present invention includes a surface treatment layer formed using a water-based surface treatment agent containing a silicon compound within a specific content range, compared to Reference Example 12 not including the silicon compound, Reference Example 6 including the silicon compound in an amount below the specific content range, and Reference Example 7 including the silicon compound in an amount exceeding the specific content range, the artificial leather of Examples 1 to 3 has proper coefficient of kinetic friction and squeak index, and has antifouling properties that are equal or superior to those of Reference Examples 6, 7, and 12.

In addition, since the surface treatment layer of the artificial leather of Examples 1 to 3 according to the present invention is irradiated with infrared light, compared to Reference Example 8 not including an infrared light radiation step, the artificial leather of Examples 1 to 3 has improved coefficient of kinetic friction.

In addition, in the cases of Reference Example 9 in which the stirring time of a water-based solvent and a curing agent is not sufficient in the preparation of the water-based surface treatment agent, Reference Example 10 in which a water-based solvent is added to a curing agent without adding the curing agent to the water-based solvent in the preparation of the water-based surface treatment agent, and Reference Example 11 in which, after a water-based surface treatment agent is applied onto a skin layer, the skin layer is not sufficiently dried, whitening occurs.

In addition, compared to Examples 1 to 3 according to the present invention, in the case of Reference Examples 9 to 11, surface crosslinking density is degraded, and coefficient of kinetic friction is not satisfactory.

3. Measurement of Size, Number, and Shape of Foam Cells in Foam Layer of Artificial Leather The artificial leather manufactured in Example 1 and Comparative Example 1 was cut in the vertical direction, and the size (average diameter), number, and shape of foam cells included in the side cross section of a foam layer were measured, and the results are shown in Table 4.

When the size (average diameter) of the foam cells was measured, artificial leather was cut in the vertical direction, and the average diameter of foam cells formed in a unit area of 1 mm² in the side cross section of the foam layer 13b' was measured using a scale bar of an optical microscope.

When the number of the foam cells was measured, artificial leather was cut in the vertical direction, and the number of foam cells formed in a unit area of 1 mm² in the side cross section of the foam layer 13b' was measured using an optical microscope.

TABLE 4

| | Example 1 | Comparative Example 1 |
|---|---|---|
| Foam cell size [μm] | 135-200 | 100-400 |
| Foam cell number [ea/mm²] | 15-20 | 5-10 |
| Foam cell shape | Spherical shape | Irregular |
| Foam layer thickness (mm) | 0.5 | 0.3 |

As shown in Table 4, in the artificial leather of Example 1 according to the present invention, an embossed pattern is formed using calender molding and vacuum. Accordingly, even after embossing molding, the spherical shape of foam cells in a foam layer may be maintained. In addition, an average diameter of foam cells is 135 to 200 μm, and the number of foam cells in the side cross section of a foam layer is 15 to 20 ea/mm². These results indicate that the artificial leather of Example 1 is light, and has excellent cushioning and aesthetics and high ductility. On the other hand, in the artificial leather of Comparative Example 1, an embossed pattern is formed through roller pressing. Accordingly, the shape of foam cells is elongated or distorted, the size and number of foam cells is small, and a foam layer is thin. Thus, in terms of cushioning, ductility, and aesthetics, the artificial leather of Comparative Example 1 is inferior to the artificial leather of Example 1.

4. Transfer Efficiency of Embossed Pattern

When the transfer efficiency of the embossed pattern of the artificial leather of Example 1 and Comparative Example 1 was measured, the artificial leather of Comparative Example 1, in which an embossed pattern is formed through embossing molding using a roll pressing-type embossing molding apparatus, exhibited a transfer efficiency of 80 to 90%. On the other hand, the artificial leather of Example 1 according to the present invention, in which an embossed pattern is formed through embossing molding using a vacuum embossing molding apparatus, exhibited a transfer efficiency of almost 100%.

[Description of Symbols]

| 1: | ARTIFICIAL LEATHER | 11: | BACK LAYER |
|---|---|---|---|
| 13B, 13B': | FOAM LAYERS | 13A: | PRE-FOAM LAYER |
| 15: | SKIN LAYER | 17: | SURFACE TREATMENT LAYER |
| 19: | EMBOSSED PATTERN | 19A: | VALLEYS OF EMBOSSED PATTERN |
| 19B: | CRESTS OF EMBOSSED PATTERN | | |

The invention claimed is:

1. Artificial leather having a microhardness of 45 to 59, wherein the microhardness is a maximum value measured immediately after a needle is in contact with the artificial leather at an indentation speed of 1 mm/s in a peak hold mode using a microhardness tester, which is, when a load holding time of the needle is 1 second,
wherein, the artificial leather comprises a back layer, a coating layer, a foam layer, a skin layer and a surface treatment layer sequentially laminated on an upper surface of the back layer, wherein an embossed pattern is formed on upper surfaces of the skin layer and the surface treatment layer,
wherein the coating layer is formed using a coating solution containing 70 to 130 parts by weight of a plasticizer and 0.5 to 10 parts by weight of a curing agent based on 100 parts by weight of a polyvinyl chloride resin, and the polyvinyl chloride resin is a mixed resin consisting of 60 to 90% by weight of a homopolymer of vinyl chloride and 10 to 40% by weight of a copolymer of vinyl chloride and vinyl acetate, wherein the foam layer comprises 60 to 120 parts by weight of a plasticizer, 5 to 15 parts by weight of a foaming agent, and 5 to 20 parts by weight of a copolymer of vinyl chloride and vinyl acetate based on 100 parts by weight of a polyvinyl chloride resin, and the polyvinyl chloride resin is a polyvinyl chloride resin having a degree of polymerization of 900 to 1,200, wherein the skin layer comprises 60 to 120 parts by weight of a plasticizer and a pigment based on 100 parts by weight of a polyvinyl chloride resin, and the polyvinyl chloride resin is a polyvinyl chloride resin having a degree of polymerization of 1,250 to 3,000, and wherein the back layer has a thickness of 0.4 to 0.7 mm, the coating layer formed on the back layer has a thickness of 1 to 10 μm, the foam layer has a thickness of 0.4 to 0.7 mm, the skin layer has a thickness of 100 to 300 μm, and the surface treatment layer has a thickness of 4 to 30 μm.

2. The artificial leather according to claim 1, wherein, when viscosity is measured at 25° C. using a Zahn cup (cup #3) viscometer, viscosity of the coating solution is 80 to 140 seconds.

3. The artificial leather according to claim 1, wherein peel strength between the back layer and the foam layer is 2.5 to 6 kgf/30 mm.

4. The artificial leather according to claim 1, wherein the foam layer comprises 10 to 30 spherical foam cells having an average diameter of 120 to 250 μm per unit area of 1 $mm^2$ in a side cross section or horizontal cross section of the foam layer.

5. The artificial leather according to claim 1, wherein the artificial leather has a squeak index of less than 0.15 and a coefficient of kinetic friction of 0.2 to 0.5.

6. The artificial leather according to claim 1, wherein the embossed pattern is formed through vacuum adsorption molding.

7. The artificial leather according to claim 1, wherein areas where thickness difference between portions of the surface treatment layer respectively formed on a valley and a crest of the embossed pattern is less than 5 μm occupy 80% or more of a total surface of the artificial leather.

8. The artificial leather according to claim 1, wherein areas where a ratio of thickness of a portion of the surface treatment layer formed on a crest of the embossed pattern to thickness of a portion of the surface treatment layer formed on a valley of the embossed pattern is 0.7 to 1 occupy 80% or more of a total surface of the artificial leather.

* * * * *